US010737376B2

(12) United States Patent
Strandlund

(10) Patent No.: US 10,737,376 B2
(45) Date of Patent: Aug. 11, 2020

(54) HVAC ROUGH IN MEASURING DEVICE

(71) Applicant: Jim Strandlund, Mora, MN (US)

(72) Inventor: Jim Strandlund, Mora, MN (US)

( * ) Notice: Subject to any disclaimer, the term of this patent is extended or adjusted under 35 U.S.C. 154(b) by 238 days.

(21) Appl. No.: 16/008,691

(22) Filed: Jun. 14, 2018

(65) Prior Publication Data

US 2019/0099875 A1 Apr. 4, 2019

Related U.S. Application Data

(60) Provisional application No. 62/566,754, filed on Oct. 2, 2017.

(51) Int. Cl.
*G01B 3/14* (2006.01)
*B25H 7/02* (2006.01)

(52) U.S. Cl.
CPC .................................... *B25H 7/02* (2013.01)

(58) Field of Classification Search
CPC ....................................................... B25H 7/02
USPC .................................................. 33/528, 563
See application file for complete search history.

(56) References Cited

U.S. PATENT DOCUMENTS

| | | | | | |
|---|---|---|---|---|---|
| 1,612,455 | A * | 12/1926 | McGeorge | H02G 1/00 | 33/528 |
| 2,903,919 | A * | 9/1959 | Paquin | B25H 7/02 | 408/115 R |
| 5,222,303 | A * | 6/1993 | Jardine | G01B 3/02 | 33/528 |
| 5,706,586 | A * | 1/1998 | Payne | B25H 7/00 | 33/528 |
| 5,960,554 | A * | 10/1999 | Kamykowski | G01B 3/14 | 33/486 |
| 6,376,770 | B1 * | 4/2002 | Hyde | H02G 3/123 | 174/50 |
| 7,739,806 | B1 * | 6/2010 | Pater | B25H 7/02 | 33/415 |
| 2004/0078990 | A1 * | 4/2004 | Boys | B25H 1/0078 | 33/528 |
| 2006/0000102 | A1 * | 1/2006 | Lawson | G01B 3/14 | 33/562 |
| 2008/0155845 | A1 * | 7/2008 | Digavero | E04F 21/00 | 33/528 |
| 2016/0178339 | A1 * | 6/2016 | Knowlton | G01B 3/14 | 33/562 |
| 2019/0329586 | A1 * | 10/2019 | Mackey | B25H 7/02 | |

* cited by examiner

*Primary Examiner* — George B Bennett
(74) *Attorney, Agent, or Firm* — Greg N. Geiser; Gutwein Law

(57) ABSTRACT

A measuring tool and device designed to allow for the quick determination for the location and marking of a rough in opening in the installation of HVAC components. The device is generally comprised of planar body having a specific dimension and including at least one aperture placed within a perimeter of the planar body corresponding to the size of a desired HVAC opening. Accordingly, the device can be generally utilized by a user to quickly mark the rough in opening by placing the device on a floor surface aligned with a soleplate and framing studs and floor joists.

15 Claims, 2 Drawing Sheets

HVAC ROUGH IN MEASURING DEVICE

CROSS REFERENCE TO RELATED APPLICATIONS

This application claims priority to U.S. Provisional Patent Application No. 62/566,754 filed 2 Oct. 2017 to the above named inventor, and is herein incorporated by reference in its entirety.

FEDERALLY SPONSORED RESEARCH OR DEVELOPMENT

Not Applicable

SEQUENCE LISTING, A TABLE, OR A COMPUTER PROGRAM

Not Applicable

FIELD OF THE INVENTION

This invention relates generally to a measuring device specifically adapted to aid in the marking of locations for HVAC connections and vents during construction rough-in and installation.

BACKGROUND

In the heating, ventilation, and air conditioning (HVAC) industry, it is known that during construction, and most particularly in new construction, several markings are necessary to enable the proper position and location of the various ducts and vents within the installation of HVAC systems. A given HVAC system is generally installed with rough-in openings for the various registers and vents. Typically, these openings are of a standard size rectangular. The most common sizes are: 4"×12", 2¼"×12", and 4"×10", although other sizes may be utilized.

Traditionally, these measurements are made and marked individually through the use of a tape measure, framing square, construction square, carpenters square, speed square or other similar measuring or marking device. Accordingly, a user will generally position the measuring device against a soleplate of a rough wall frame and mark the dimensions of an opening for the placement of the HVAC component. Typically, the user will measure out a distance of 4" perpendicular to soleplate for the positioning of a first edge of an opening to be marked and cut. This process is generally repeated to measure and mark the remaining edge locations representing the width and length of the desired opening.

Given the large amount of vents and runs in an HVAC system for a given structure, this can be tedious and time consuming process. Therefore, there exists a need for a device to improve and streamline the measuring process for the location of the rough openings within the HVAC installation process. Preferably this device is durable and adapted to accommodate multiple sized HVAC rough-in opening sizes.

BRIEF SUMMARY OF THE INVENTION

In one aspect, this disclosure is related to a measurement tool specifically adapted for the quick efficient measuring and marking of the location of the rough openings necessary for the installation of various HVAC components.

In another aspect, this disclosure is related to a device for marking the locations of the rough openings of various HVAC components. The device is a rigid and solid planar body having at least one aperture. The at least one aperture positioned at a predetermined distance from an edge of the planar body and having a size corresponding a standard rough opening for the marking and cutting of a rough-in HVAC opening. The edges of the planar body are provided with measurement indicators to generally allow for positioning of the planar body in a different or alternate position during use.

Preferably, the device is substantially square in shape having a width and a length and provided with a pair of apertures positioned within an interior of the device. Each aperture of the pair of apertures is positioned a predetermined distance from an opposed edge of the device and having a size corresponding to a standard rough opening size used for the marking, cutting, and installation of HVAC components.

In use, the device is positioned with an edge against the soleplate of a wall and in contact with the soleplate along this entire edge. The at least one aperture will then be in the proper position for the marking of the rough opening and wherein the aperture can simply be traced to indicate the location for the cutting of the rough opening. If a user would like to alter the position of the rough opening to a position where the edge cannot be in contact with the soleplate, the measurement indicators placed on the device can be utilized for alignment and placement of the device.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to further explain the principles of the invention. Other aspects of the invention and the advantages of the invention will be better appreciated as they become better understood by reference to the Detailed Description when considered in conjunction with accompanying drawings, and wherein.

DETAILED DESCRIPTION OF THE INVENTION

Figure 1:
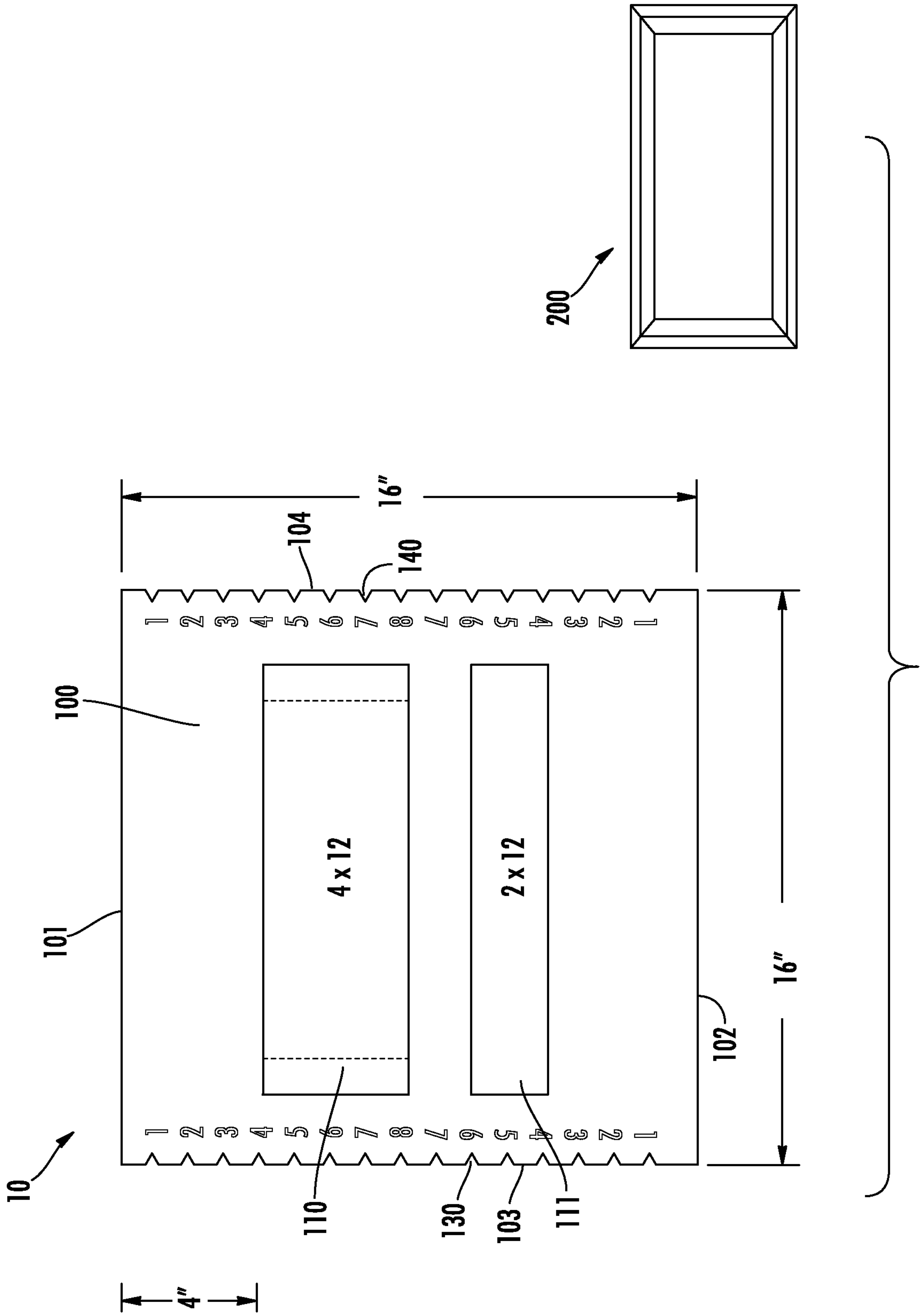
FIG. 1 is a top side view of device and insert including the preferred dimensions, according to the present invention.

The following detailed description includes references to the accompanying drawings, which forms a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful, and is not intended to exclude other embodiments from the scope of the invention.

As used herein, the terms "front," "back," "rear," "upper," "lower," "right," and "left" in this description are merely used to identify the various elements as they are oriented in the FIGS, with "front," "back," and "rear" being relative to the apparatus. These terms are not meant to limit the elements that they describe, as the various elements may be oriented differently in various applications.

As used herein, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Figure 2:
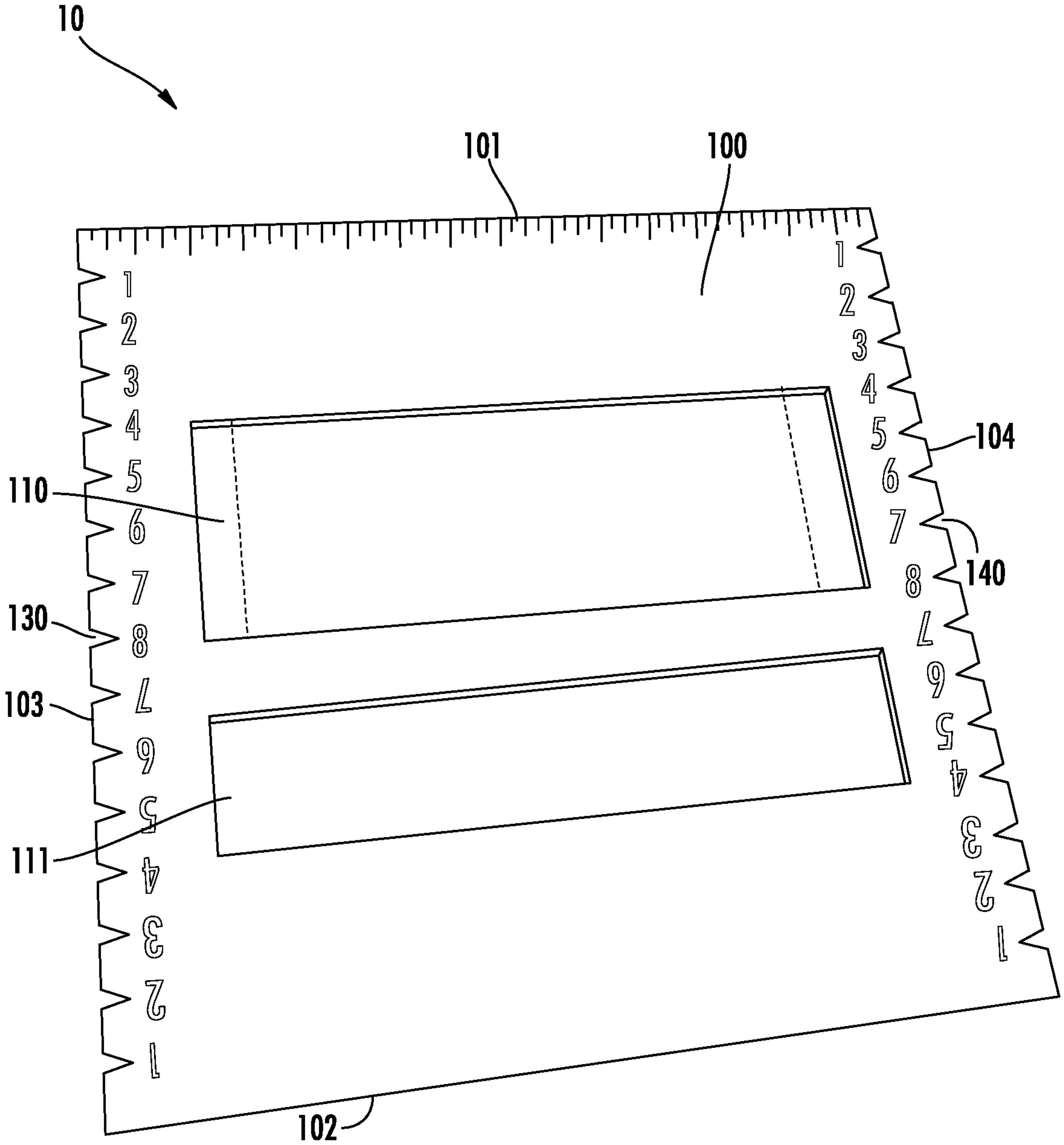
FIG. 2 is an isometric view of the device according to the present invention.

Referring now to FIGS. 1-2 of the HVAC rough in measuring device of the present disclosure and generally referred to as device 10. The device 10 of the present disclosure is a dimensioned measuring device or otherwise referred to as a tool and configured for alignment with framed walls during rough in construction to aid in the marking for the placement of openings for the HVAC components within a structure. The device 10 is generally a planar body 100 having a pair of opposed edges 101, 102 defining a length of the device 10 and a pair of opposed sides 103, 104 defining a width of the device 10, wherein the opposed edges 101,102 and opposed sides 103, 104 are in communication and define a perimeter of the device 10. The planar body 100 is generally constructed out of a rigid material such as a metal or plastic with a generally flat profile configured to be placed in a horizontal position along a floor surface during use.

At least one aperture 110 is placed within the perimeter of the device 10 at an interior and having a specific size and shape corresponding to an HVAC rough in opening dimension. The at least one aperture 110 is generally provided in the form of a rectangular shape corresponding to the dimensions of a common HVAC rough in opening, wherein the rectangular shape of the at least one aperture 110 is preferably selected from the dimensions of: 4"×12", 2¼"×12", 4"×10", or other similar and common sizes corresponding to an HVAC system rough in opening.

Along the opposed sides 103, 104 and extending the length of the device 10, the planar body 100 includes a plurality of indicators 130, 140 that are placed at substantially equally spaced intervals. The indicators 130, 140 are configured to allow for use of the device 10 in measurement and alignment for the placement of the device 10 during use. The indicators 130, 140 may be provided in a notch or a marking, wherein the indicators 130, 140 are generally an indent in the opposed sides 103, 104 towards the interior of the device 10. In use, the indicators 130, 140 can be utilized to align the device 10 when the device 10 is placed in a position that is not directly against the soleplate.

In the preferred embodiment of the present invention, the device 10 is provided in a specific dimension and with specific features to provide for a more universal use. Accordingly and preferably, the device 10 width is provided at 16" (inches) to correspond generally to the distance between rough in wall studs and floor joists, wherein the device 10 is specifically placed against the soleplate and aligned with the center point of the rough in wall studs and floor joists.

In an alternate and preferred embodiment, the device 10 includes a first aperture 110 and a second aperture 111. The first aperture is positioned centrally along the width of the device and positioned 4" (inches) in distance adjacent one of the opposed edges 101, 102. The second aperture 111 is positioned 4" (inches) from one of the opposed edges 101, 102 opposite the edge 101, 102 the first aperture 110 is placed adjacent to. Preferably, the first aperture 110 is provided in a dimension with a width of 12" (corresponding to a direction between the opposed sides 103, 104) and a length of 4" (corresponding to a direction between the opposed edges 101, 102). Preferably, the second aperture 111 is provided in a dimension with a width of 12" (corresponding to a direction between the opposed sides 103, 104) and length of 2¼" (corresponding to a direction between the opposed edges 101, 102).

Accordingly, the first aperture 110 and second aperture 111 provide dimensions for standard sizes of the rough opening cut for the installation of HVAC components that can easily be traced for indicating the location of the cut for the rough opening during installation. Accordingly, the first aperture 110 or second aperture 111 could be provided in an alternate size, such as 4"×10", to correspond to an alternate standard dimension within the device 10 interior space.

The device 10 may include a sleeve member 200 in an assembly, wherein the sleeve member 200 can be provided to alter the dimensions of the aperture 110 within the planar body 100 interior. Accordingly, the sleeve member 200 functioning as a type of insert placed within the aperture 110 to change the dimension to provide a user of the device 10 a plurality of dimensional options for the aperture 110 during use. Generally, the sleeve member 200 provided in an assembly where it is dropped into the aperture 110 in a snap fit coupling, wherein multiple sleeves 200 can be interchanged for placement within the aperture 110.

In use, the device 10 is placed against the soleplate with the preferred edge 101, 102 corresponding to the desired aperture 110 to be used, with the edge 101, 102 in contact with the soleplate and aligned with the wall studs, the preferred aperture 110 interior perimeter is then traced to indicate the location of the rough opening for the HVAC component. Accordingly, a user is quickly able to indicate the location of the opening by simply placing the device 10 on the floor in the proper position without any additional measuring or use of additional measuring devices, wherein this process can be repeated quickly multiple times during the rough in construction and assembly of the HVAC system.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) but that the invention will include all embodiments falling with the scope of the appended claims.

What is claimed is:

1. A measuring device for adapted to aid in marking the location of a position for cutting a rough in opening for an HVAC component, the measuring device comprising:

a generally flat and planar body portion, the body portion having a width and length, the width being the distance between opposed sides of the device and the length being the distance between opposed edges of the device, the opposed edges and opposed sides defining a perimeter of the device;

an aperture, the aperture selected from a predetermined size having a width and a length corresponding to a standard HVAC rough in opening, the aperture positioned within the perimeter of the planar body portion and positioned a predetermined distance from an edge of the device; and a plurality of indicators, the indicators positioned a predetermined distance apart along the opposed sides of the device extending the length of the device.

2. The device of claim 1, wherein the device includes a second aperture, the second aperture positioned at an opposed edge of the first aperture within the perimeter of the planar body, the second aperture corresponding to a second standard HVAC rough in opening size.

3. The device of claim 2, wherein the pair of apertures are positioned a distance four inches away from the opposed edges of the device.

4. The device of claim 1, wherein the plurality of indicators are a notch, wherein the notch is configured as an indent positioned along the opposed sides and extending into the perimeter in a direction towards an interior of the planar body.

5. The device of claim 1, wherein the aperture has a width of twelve inches and a length of four inches.

6. The device of claim 3, wherein the first aperture has a width of twelve inches and a length of four inches and the second aperture has a width of twelve inches and a length of two and one-quarter inches.

7. The device of claim 1, wherein the device includes a sleeve member, the sleeve member configured for placement within the aperture to generally alter the dimension of the aperture.

8. A tool configured to aid in marking a rough in opening for the installation of an HVAC component, the tool comprising:

a generally flat and planar body portion having a width and length defining a square shape, the width being the distance between opposed sides of the tool and the length being the distance between opposed edges of the tool, the opposed edges and opposed sides defining a perimeter of the square shape;

an aperture of a predetermined size having a width and a length corresponding to a standard HVAC rough in rectangular opening, the aperture positioned within the perimeter of the planar body portion and positioned a predetermined distance from an edge of the device; and a plurality of indicators, the indicators positioned a predetermined distance apart along the opposed sides of the device extending the length of the device.

9. The tool of claim 8, wherein the device includes a second aperture, the second aperture positioned at an opposed edge of the first aperture within the perimeter of the planar body, the second aperture corresponding to a second standard HVAC rough in opening size.

10. The tool of claim 9, wherein the pair of apertures are positioned a distance four inches away from the opposed edges of the tool.

11. The tool of claim 8, wherein the plurality of indicators are a notch, wherein the notch is configured as an indent positioned along the opposed sides and extending into the perimeter in a direction towards an interior of the planar body.

12. The tool of claim 8, wherein the aperture has a width of twelve inches and a length of four inches.

13. The tool of claim 10, wherein the first aperture has a width of twelve inches and a length of four inches and the second aperture has a width of twelve inches and a length of two and one-quarter inches.

14. The tool of claim 8, wherein the tool includes a sleeve member, the sleeve member configured for placement within the aperture to generally alter the dimension of the aperture.

15. A method for marking the location of a rough in opening for the installation of an HVAC component using a measuring device having a generally flat and planar body portion, an aperture, the aperture selected from a predetermined size having a width and a length corresponding to a standard HVAC rough in opening and positioned within a perimeter of the planar body portion and positioned a predetermined distance from an edge of the device, the method comprising the steps of:

laying the measuring device flat along a surface to be marked;

aligning the edge of the device with a soleplate of a construction framing in a desired position; and marking the surface by tracing the length and the width of the aperture with a writing implement.

* * * * *